United States Patent
Delpier et al.

(10) Patent No.: US 10,514,730 B2
(45) Date of Patent: Dec. 24, 2019

(54) HINGE INCLUDING A LOCK

(71) Applicant: Hewlett-Packared Development Company, L.P., Houston, TX (US)

(72) Inventors: Michael Delpier, Houston, TX (US); Dustin Hoffman, Houston, TX (US); Dawn Pendergast, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/748,828

(22) PCT Filed: Oct. 29, 2015

(86) PCT No.: PCT/US2015/058036
§ 371 (c)(1),
(2) Date: Jan. 30, 2018

(87) PCT Pub. No.: WO2017/074382
PCT Pub. Date: May 4, 2017

(65) Prior Publication Data
US 2018/0224902 A1     Aug. 9, 2018

(51) Int. Cl.
*G06F 1/16* (2006.01)
*E05D 3/02* (2006.01)
*E05D 11/10* (2006.01)

(52) U.S. Cl.
CPC .......... *G06F 1/1681* (2013.01); *E05D 3/022* (2013.01); *E05D 11/1007* (2013.01); *G06F 1/1618* (2013.01); *G06F 1/1679* (2013.01); *E05Y 2900/606* (2013.01)

(58) Field of Classification Search
CPC ............ E05D 11/1007; E05D 11/1028; E05D 2011/1035
See application file for complete search history.

(56) References Cited

U.S. PATENT DOCUMENTS

| | | | |
|---|---|---|---|
| 6,505,382 B1 | 1/2003 | Lam et al. | |
| 7,251,129 B2 | 7/2007 | Lee et al. | |
| 8,104,823 B2* | 1/2012 | Kohlstrand | E05D 11/1007 16/82 |
| 8,898,862 B1* | 12/2014 | McGrath | E05D 11/1007 16/326 |
| 9,273,503 B2* | 3/2016 | Van Gennep | E05D 11/1007 |
| 9,477,269 B2* | 10/2016 | Morrison | G06F 1/1681 |
| 9,506,281 B1* | 11/2016 | Zaloom | E05D 11/1028 |
| 9,811,123 B2* | 11/2017 | Park | G06F 1/1681 |
| 9,933,009 B1* | 4/2018 | Zaloom | A45C 13/36 |
| 2005/0046260 A1 | 3/2005 | Yamashita | |
| 2005/0057894 A1 | 3/2005 | Kim et al. | |

(Continued)

*Primary Examiner* — Victor D Batson
*Assistant Examiner* — Matthew J Sullivan
(74) *Attorney, Agent, or Firm* — HPI Patent Department

(57) ABSTRACT

A hinge rotatably attaches a display to a base, the hinge including a rotatable shaft and the hinge to rotate the display between a first position and a second position, a display screen of the display facing in a first direction when the display is at the first position, and the display facing in a second direction opposite the first direction when the display is at the second position. The hinge includes a lock to fix the display at an angle that is inclined with respect to the base and with respect to a plane that is perpendicular to a main surface of the base.

11 Claims, 5 Drawing Sheets

(56) References Cited

U.S. PATENT DOCUMENTS

| | | | |
|---|---|---|---|
| 2008/0141495 A1* | 6/2008 | Fisher | A63H 33/008 16/343 |
| 2009/0025182 A1 | 1/2009 | Hung | |
| 2009/0044578 A1 | 2/2009 | Boss et al. | |
| 2010/0321882 A1 | 12/2010 | Tracy et al. | |
| 2013/0135809 A1 | 5/2013 | Uchiyama et al. | |
| 2013/0194741 A1 | 8/2013 | Uchiyama et al. | |
| 2013/0219663 A1 | 8/2013 | Lenovo | |
| 2013/0322011 A1 | 12/2013 | Yeh | |
| 2015/0007416 A1 | 1/2015 | Chen | |
| 2017/0022740 A1* | 1/2017 | Hall | E05D 11/06 |
| 2017/0122018 A1* | 5/2017 | Huang | E05D 3/02 |

* cited by examiner

HINGE INCLUDING A LOCK

BACKGROUND

Portable electronic devices can be carried by users as the users travel to different places. Examples of portable electronic devices include notebook computers, tablet computers, smart watches, and so forth. A notebook computer can include a base and a display that is rotatably attached to the base. The display can be moved between a closed position where the display lies on top of the base, in an open position where the display is flipped open so that a user can view a display screen of the display.

BRIEF DESCRIPTION OF THE DRAWINGS

Some implementations are described with respect to the following figures.

DETAILED DESCRIPTION

Electronic devices (such as notebook computers, tablet computers, smart phones, game appliances, etc.) can be provided with touch-sensitive displays that accept touch input by either a user's finger or a stylus. An electronic device can allow for 360° rotation of the display with respect to a base of the electronic device. The ability to rotate 360° allows the display to start at a first position (closed position) at which the display is closed onto and lies on the base (the display screen of the display faces the base in this first position), and a fully rotated open position at which the display has been rotated 360° such that the rear of the display faces and lies on the base, and the display screen faces away from the base.

Note that a display being able to rotate 360° with respect to the base can refer to the display being able to rotate between 0° to 360° with respect to the base, or to the display being able to rotate between substantially 0° and substantially 360° with respect to the base. Substantially 0° can refer to a position of the display relative to the base of the electronic device where the display is at an angle of between 0° to 10° of the base (with the display screen of the display facing towards the base). Substantially 360° can refer to a position of the display relative to the base of the electronic device where the display is at an angle of between 350° to 360° of the base (with the display screen of the display facing away from the base).

When the display is rotated to an inclined angle with respect to the base such that the touch-sensitive display screen of the display faces generally towards a user, the user is able to use a finger or a stylus to make touch inputs on the touch-sensitive display screen. However, when the display is at the inclined angle (where the display does not lie on the base), there may not be sufficient frictional force at the hinge that rotatably attaches the display to the base to maintain the angled position of the display as the user is making touch inputs, such as when the user is drawing on the touch-sensitive display screen or providing other touch inputs on the touch-sensitive display screen. The touch inputs made by the user may cause inadvertent and undesired rotational movement of the display relative to the base.

In accordance with some implementations of the present disclosure, a lock is provided at a hinge that rotatably attaches the display to the base of the electronic device. Once the user has rotated the display to an inclined angle with respect to the base such that the touch-sensitive display screen is at a target inclined position to allow for touch input, the user can actuate the lock to fix the display at the inclined angle. In this manner, touch inputs made by the user on the touch-sensitive display screen would not cause inadvertent rotational movement of the display with respect to the base.

Figure 1A:
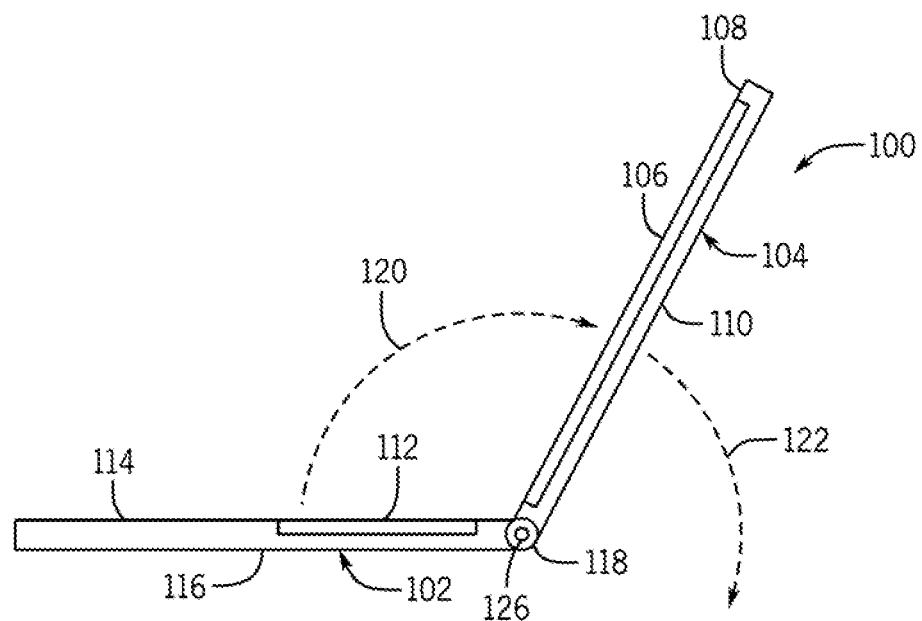
FIGS. 1A-1B are side views of an example electronic device including a display and base rotatably coupled by a hinge including a lock according to some implementations.
Figure 1B:
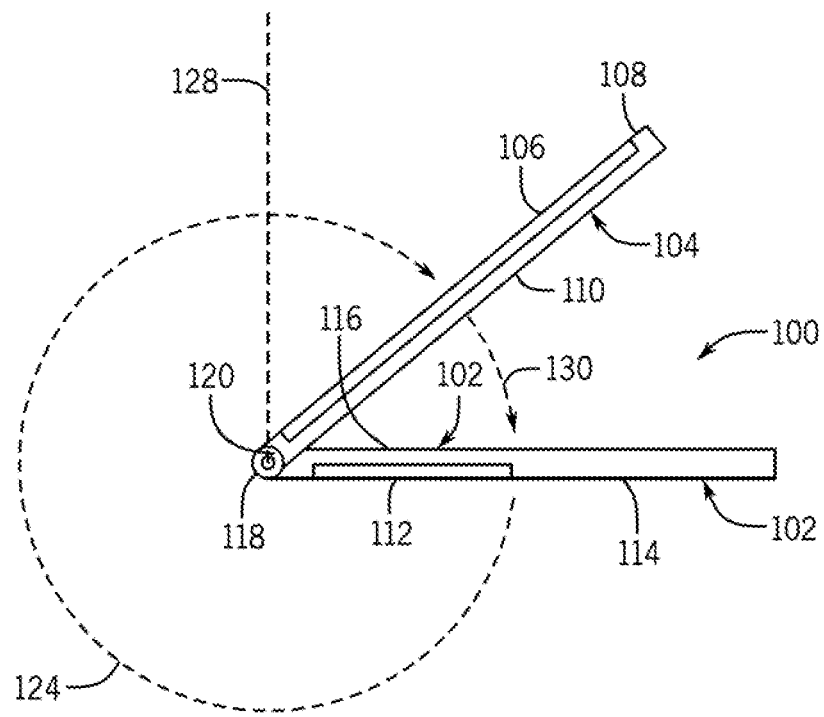

FIGS. 1A-1B illustrate an electronic device 100 that includes a base 102 and a display 104. The display 104 includes a touch-sensitive display screen 106. The touch-sensitive display screen 106 is provided on a front surface 108 of the display. A rear surface 110 of the display 104 is on the opposite side of the display 104 than the side that the front surface 108. The front surface 108 and the rear surface 110 are generally parallel to each other (to within ±10°, for example).

The base 102 includes a keyboard 112 that is provided in a main surface 114 of the base 102. The base 102 also includes a rear surface 116 that is on the opposite side of the base 102 than the main surface 114. The main surface 114 and the rear surface 116 can be generally parallel. A "main surface" of the base 102 refers to a surface in which a keyboard and/or a touchpad of the electronic device 100 is provided.

A hinge 118 rotatably attaches the display 104 to the base 102. As shown in FIG. 1A, a rotational arrow 120 shows rotation, by a user, of the display 104 from a fully closed position (where the display 104 is at substantially 0° with respect to the base 102) to an intermediate open position (where the display 104 is at an angle between 0° and 180° with respect to the base 102). Another rotational arrow 122 shows further possible rotation of the display 104 from the intermediate rotational position shown in FIG. 1A to another rotational position past 180° of the display 104 with respect to the base 102.

FIG. 1B shows rotation (along rotational arrow 124 to a position of the display 104 that is past 270°) by a user of the display 104 with respect to the base 102. In FIG. 1B, the display 104 is at a rotational position that is between 270° and 360° (or between 290° and 340°) with respect to the base 102.

In the rotational position shown in FIG. 1B, the display 104 is at a non-zero inclined angle with respect to the base 102, where the touch-sensitive display screen 106 faces away from the base 102 and generally towards a user who desires to make touch inputs on the touch-sensitive display screen 106 with the user's finger or a stylus. In the position shown in FIG. 1B, the rear surface 110 of the display 104 faces the rear surface 116 of the base 102. At the inclined angle shown in FIG. 1B, a user can conveniently make touch inputs on the touch-sensitive display screen 106.

In accordance with some implementations of the present disclosure, the hinge 118 is provided with a lock 126 that is actuatable by the user to lock the display 104 in position, to prevent rotation of the display 104 with respect to the base 102. When the lock 120 is actuated, the display 104 is fixed in position with respect to the base 102 at the inclined angle, such as at the inclined angle shown in FIG. 1B.

At the inclined angle shown in FIG. 1B, the display 104 is at an angle that is inclined with respect to the base 102 (more specifically, with respect to the main surface 114 of the base 102) and also inclined with respect to a plane 128 that is perpendicular to the main surface 114 of the base 102. The plane 128 is at a position that is 270° away from the main surface 114 of the base 102.

FIG. 1B shows another rotational arrow 130 that depicts possible further rotation of the display 104 towards the rear surface 116 of the base 102, assuming that the lock 120 has been released to allow for rotation of the display 104 with respect to the base 102. The further rotation shown by rotational arrow 130 allows the rear surface 110 of the display 104 to contact and lie on the rear surface 116 of the base 102, a position where the display 104 has been rotated substantially 360° with respect to the base 102.

Figure 2A:
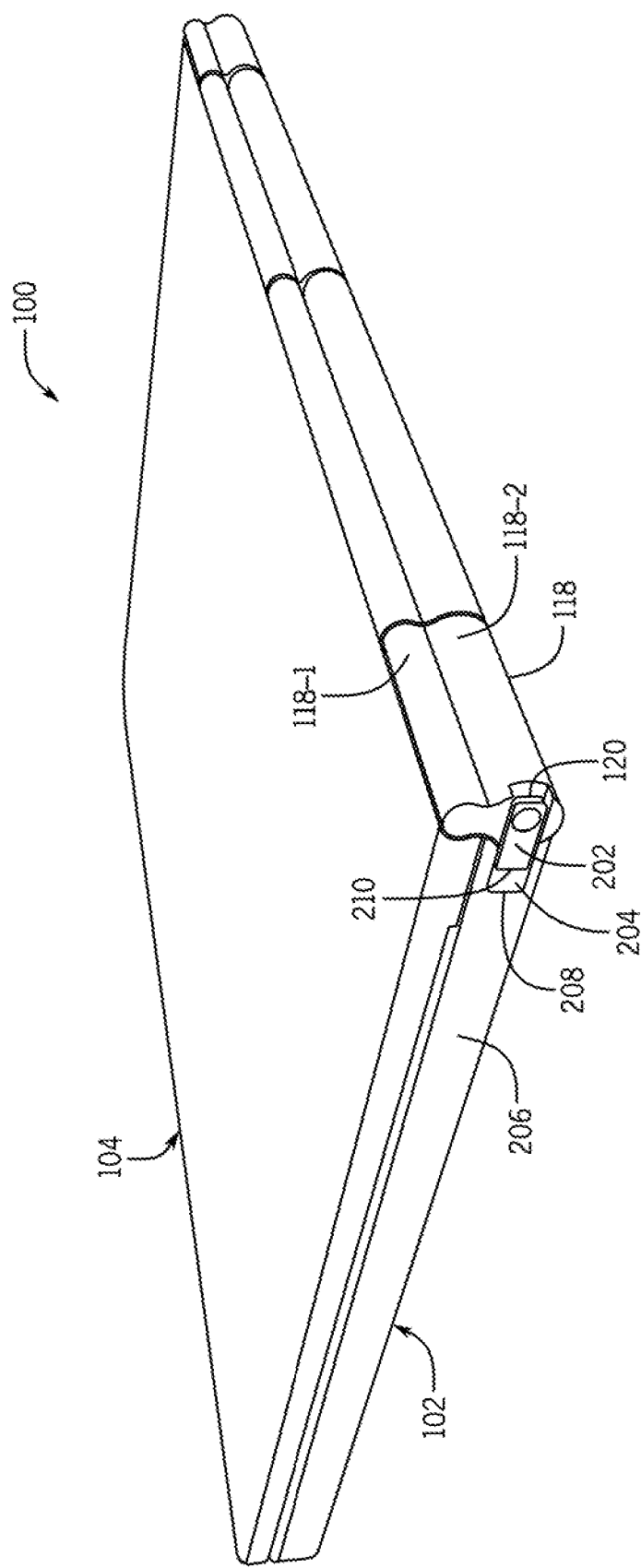
FIGS. 2A-2C are perspective views of an example electronic device to illustrate rotation of a display relative to a base, where rotation of the display is lockable with respect to the base according to some implementations.
Figure 2B:
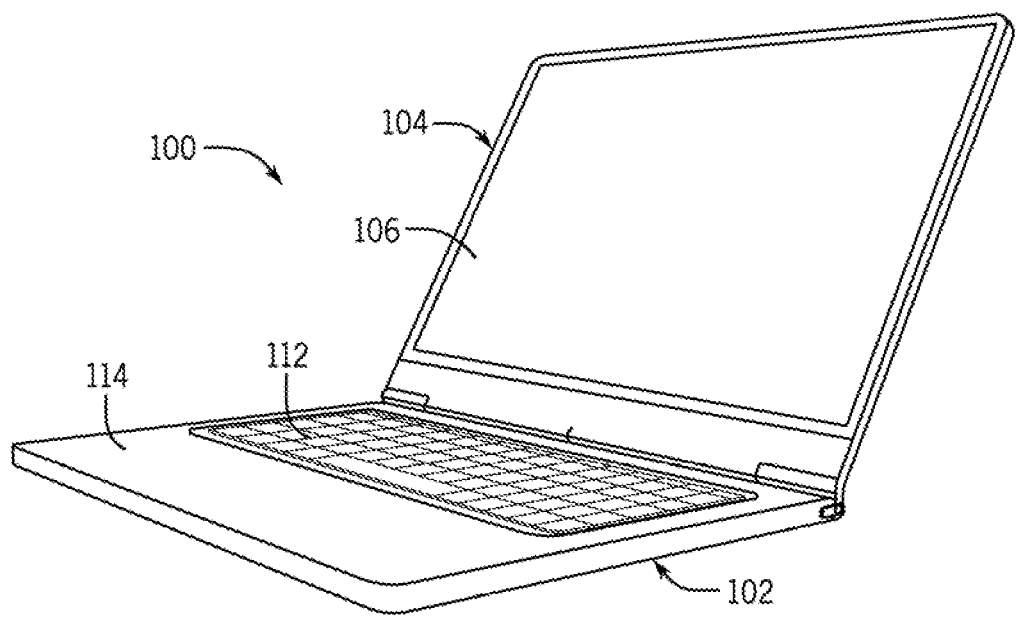
Figure 2C:
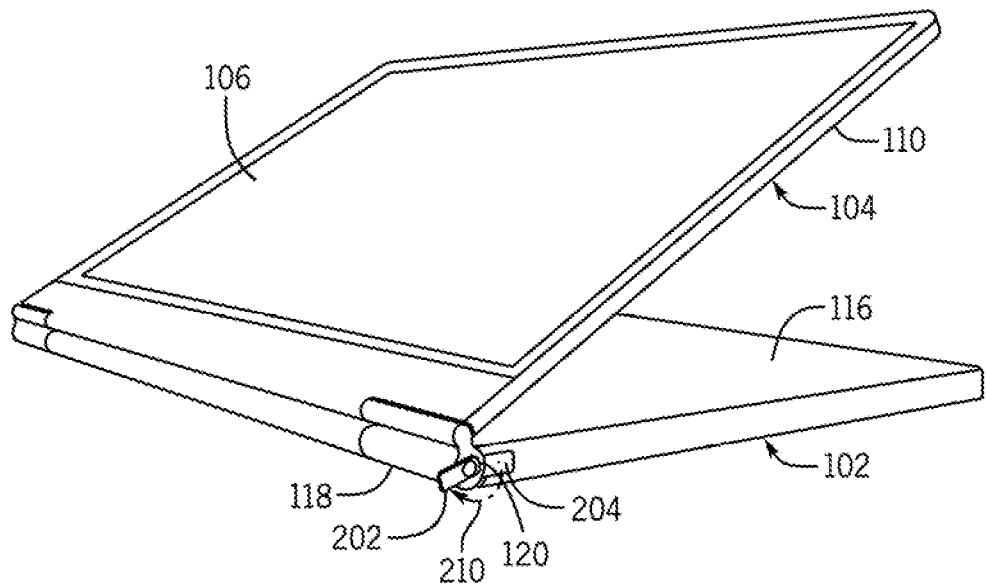

FIGS. 2A-2C illustrate various positions of the notebook computer 100 according to some implementations. In FIG. 2A, the display 104 is closed onto the base 102, such that the touch-sensitive display screen of the display 104 lies on and is in contact with the main surface of the base 102. In the position of FIG. 2A, the display 104 is at substantially 0° with respect to the base 102, and the display screen 106 (shown in FIGS. 1A-1B) of the display 104 faces the main surface 114 of the base 102.

The user-actuatable lock 120 that is provided with the hinge 118 is shown in a released (or unlocked) position in FIG. 2A. In implementations according to FIGS. 2A-2C, the example lock 120 includes a lever 202 (which is a form of a user-actuatable member of the lock 120) that is shown resting in a groove 204 formed in a sidewall 206 of the base 102. A gap is provided between an end 208 of the groove 204 and an end 210 of the lever 202 to allow a user's finger to reach into the groove 204 to pull the lever 202 away from the groove 204.

Assuming the lock 120 remains in its released position shown in FIG. 2A, a user can rotate the display 104 away from the base 102, as shown in FIG. 2B. In FIG. 2B, the display 104 has been rotated to slightly beyond 90° of the base 102, such that the touch-sensitive display screen 106 faces towards the user. In the arrangement shown in FIG. 2B, the electronic device 100 is in a traditional notebook computer arrangement in which the user can type on the keyboard 112 to provide input to the user interface displayed by the display screen 106.

FIG. 2C shows further rotation of the display 104 with respect to the base 102 such that the display 104 is at an inclined angle between 270° and 360° with respect to the base 102. In the position shown in FIG. 2C, the touch-sensitive display screen 106 of the display 104 faces towards the user, with the rear surface 110 of the display 104 facing the rear surface 116 of the base 102.

As further shown in FIG. 2C, a user has reached into the groove 204 to pull out the lever 202 of the lock 120. Moreover, the user has rotated the lever 202 away from the groove 204, as indicated by rotational arrow 210. The lever 202 of the lock 120 in the position shown in FIG. 2C is the lock position, where the lock 120 has fixed the display 104 at the inclined angle (shown in FIG. 2C) with respect to the base 102 such that touch input can be provided by the user on the touch-sensitive display screen 106 of the display 104.

Figure 3:
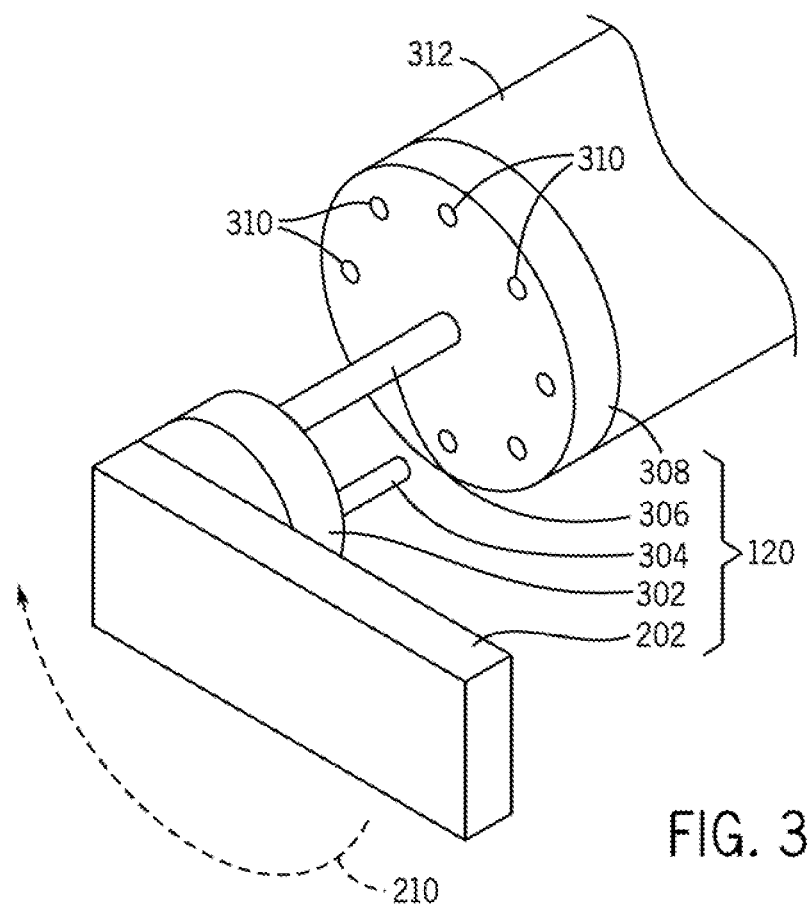
FIG. 3 is a perspective view of a portion of a hinge including a lock, according to some implementations.

FIG. 3 shows the lock 120 according to some examples. The lock 120 includes the lever 202, an attachment member 302 attached to the lever 202, a locking pin 304 protruding inwardly from the attachment member 302, a rotational member 308, and a shaft 306 that interconnects the lever 202 with the locking member 308. The locking member 308 includes various locking holes 310 into which the locking pin 304 is engageable when the lever 202 has been rotated from its release position (as shown in FIG. 3) along rotational arrow 210 to a lock position. Once the lever 202 has been rotated to the lock position, the locking pin 304 can be brought into engagement with one of the locking holes 310, to prevent further rotation of the locking member 308. The locking member 308 is attached to a rotational shaft 312 of the hinge 118.

When the locking pin 304 is not engaged in any of the locking holes 310, the rotational shaft 312 of the hinge 118 is free to rotate, to allow for rotational movement of the display 104 relative to the base 102. However, once the locking pin 304 is engaged into any of the locking holes 310, the rotational shaft 312 is locked in position (at the position defined by the respective locking hole 310 into which the locking pin 304 is engaged) to prevent rotational movement of the display 104 relative to the base 102 while the locking pin 304 remains engaged in the respective locking hole 310.

In some examples, the hinge 118 can be a dual-hinge design that includes two rotational axes indicated generally at 118-1 and 118-2 in FIG. 2A. Note that the rotational shaft 312 of FIG. 3 is rotatable about the second rotational axis 118-2.

The display 104 is able to rotate about the first rotational axis 118-1 to open from substantially 0° to substantially 180° (e.g. 170° to 190°). Once the display 104 reaches substantially 180°, further rotational movement causes the display to rotate about the second rotational axis 118-2.

Although a specific lock 120 is shown in FIG. 3, it is noted that in other examples, other types of locks can be employed. For example, such other types of locks include locks that have various gears, including a locking gear, a lock with locking clutch mechanism, and so forth.

Figure 4:
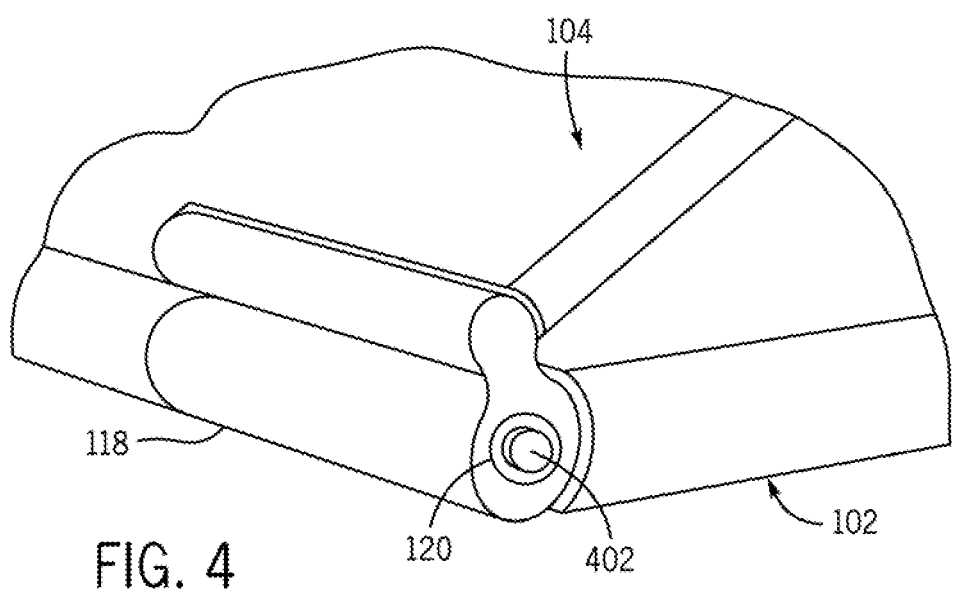
FIG. 4 is a perspective view of a portion of an electronic device including a hinge having a lock according to alternative implementations.

FIG. 4 illustrates a lock 120 according to alternative implementations. Rather than the rotatable lever 202 shown in FIGS. 2A, 2C, and 3, the lock 120 of FIG. 4 includes push button 402 (which is another form of a user-actuatable member of the lock 120) that can be actuated between a lock position and a release position. When the push button 402 is initially in the release position, pushing the push button 402 inwardly causes the push button 402 to be actuated to the lock position, which actuates the lock 120 and fixes the position of the display 104 relative to the base 102. When the push button 402 is in the lock position, another inward push on the push button 402 actuates the push button 402 to its release position to again allow for rotational movement of the display 104 relative to the base 102.

Figure 5:
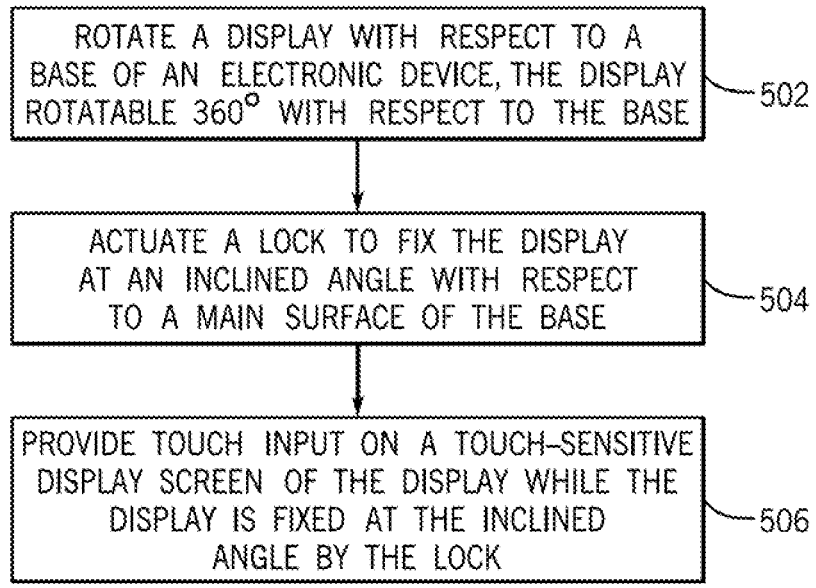
FIG. 5 is a flow diagram of an example process according to some implementations.

FIG. 5 is a flow diagram of a process for use with an electronic device (e.g. 100) according to some implementations. The process of FIG. 5 rotates (at 502) a display (e.g. display 104) with respect to a base (e.g. base 102) of the electronic device, where the display is rotatable 360° with respect to the base.

The process further actuates (at 504) a lock (e.g. lock 120) to fix the display at an inclined angle with respect to a main surface (e.g. 114) of the base 102 with respect to a plane (e.g. 128) that is perpendicular to the main surface 114 of the base.

The process further provides (at 506) touch-input (such as with a user's finger or with a stylus) on a touch-sensitive display screen (e.g. 106) of the display while the display is fixed at the inclined angle by the lock.

Figure 6:
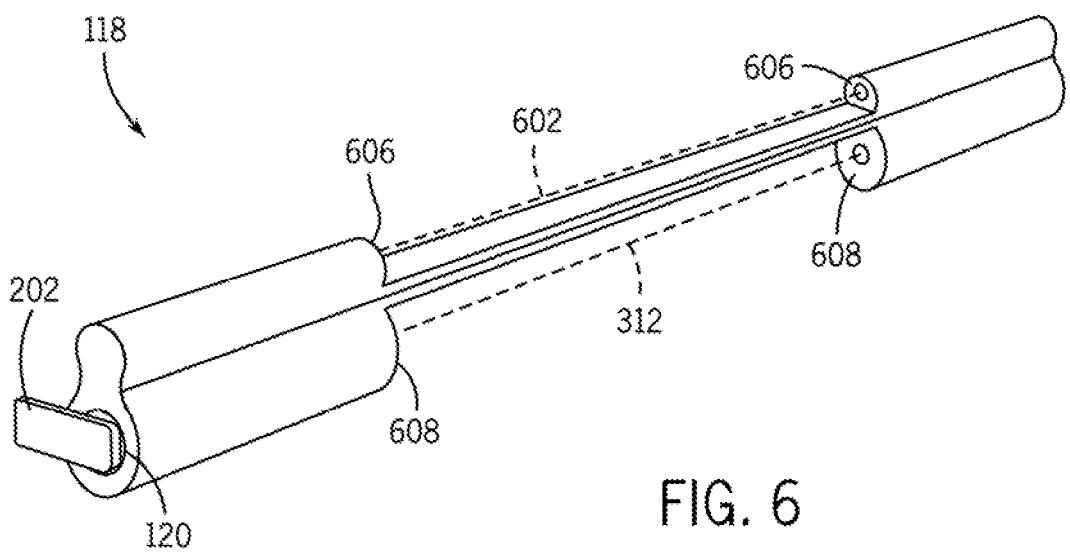
FIG. 6 is a perspective view of a hinge including a lock according to some implementations.

FIG. 6 illustrates the hinge 118 in accordance with some implementations. The hinge 118 has a dual-hinge design and includes a display attachment member 606 that defines a groove to receive a connection portion of the display 104, and a base attachment member 608 that defines a groove to receive a connection portion of the base 102. Illustrated in dashed profile is a first rotational shaft 602 that is rotatable with respect to the display attachment member 606. The rotational shaft 602 allows for rotation of the display 104 relative to the hinge 118. The second rotational shaft 312 (also illustrated in dashed profile) is rotatably attached to the base attachment member 608 and is rotatable with respect to the display attachment member 606 and base attachment member 608 of the hinge 118.

The lock 120 when actuated is able to lock the hinge 118 such that the rotational shaft 312 is rotatably locked and can no longer rotate relative to the base attachment member 608. When the lock 120 is released, the rotational shaft 312 is free to rotate relative to the base attachment member 608.

In other examples, the lock 120 when actuated can lock the first rotational shaft 602 so that the first rotational shaft 602 is no longer rotatable with respect to the display attachment member 606.

In other implementations, other hinge designs can be used, including those that do not have the dual-hinge design.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. An electronic device comprising:
    a display;
    a base comprising a groove on a sidewall of the base;
    a hinge rotatably attaching the display to the base, the hinge comprising a rotatable shaft with a plurality of locking holes and the hinge to rotate the display between a first position and a second position, a display screen of the display facing in a first direction when the display is at the first position, and the display facing in a second direction opposite the first direction when the display is at the second position,
    the hinge comprising a lock to fix the display at an angle that is inclined with respect to the base and with respect to a plane that is perpendicular to a main surface of the base, wherein the lock comprises a lever and an attachment member attached to the lever, wherein the attachment member comprises a locking pin that protrudes inwardly from the attachment member, wherein the lever rests in the groove of the base in a released positioned and the lever is pulled out of the groove and rotated to insert the locking pin into one of the plurality of locking holes for a locked position.

2. The electronic device of claim 1, wherein the display screen is a touch-sensitive display screen, and wherein, when the display is fixed at the angle, a rear surface of the display faces the base to allow touch input on the touch-sensitive display screen.

3. The electronic device of claim 1, wherein the lever comprises a user-actuatable member that upon actuation to the locked position is to fix the display at the angle.

4. The electronic device of claim 3, wherein the user-actuatable member that upon actuation to the released position releases the lock to allow rotation of the display with respect to the base.

5. A method comprising:
    rotating a display with respect to a base of an electronic device, the display rotatable 360° with respect to the base, wherein the base comprises a groove on a sidewall of the base;
    pulling out a lever resting in a groove of a sidewall of the base in a released position;
    rotating the lever to insert an attachment member attached to the lever into one of a plurality of locking holes on a rotatable shaft of a hinge that is rotatably attached to the display and the base to fix the display at an inclined angle with respect to a main surface of the base and with respect to a plane that is perpendicular to the main surface of the base, wherein the attachment member comprises a locking pin that protrudes inwardly from the attachment member; and
    providing touch input on a touch-sensitive display screen of the display while the display is fixed at the inclined angle by the lock.

6. The method of claim 5, wherein the inclined angle is greater than 270° and less than 360°.

7. The method of claim 5, wherein the inclined angle is greater than 290° and less than 340°.

8. A hinge comprising:
    a display attachment member to attach to a display of an electronic device;
    a base attachment member to attach to a base of the electronic device, wherein the base comprises a groove on a sidewall of the base;
    a rotational shaft comprising a plurality of locking holes, wherein the rotational shaft is rotatable with respect to the display attachment member or the base attachment member to rotate the display relative to the base between a first position and a second position, a display screen of the display facing in a first direction when the display is at the first position, and the display facing in a second direction opposite the first direction when the display is at the second position; and
    a lock to fix the display at an angle that is inclined with respect to the base and with respect to a plane that is perpendicular to a main surface of the base, wherein the lock comprises a lever and an attachment member attached to the lever, wherein the attachment member comprises a locking pin that protrudes inwardly from the attachment member, wherein the lever rests in the groove of the base in a released positioned and the lever is pulled out of the groove and rotated to insert the locking pin into one of the plurality of locking holes for a locked position.

9. The hinge of claim 8, wherein the rotational shaft is a first rotational shaft rotatably connected to the base attachment member, the first rotational shaft being lockable by the lock.

10. The hinge of claim 9, further comprising a second rotational shaft rotatably connected to the display attachment member, the first and second rotational shafts to provide a dual hinge assembly.

11. The hinge of claim 10, wherein the first and second rotational shafts are to enable 360° rotation of the display relative to the base.

* * * * *